United States Patent
Nakajima et al.

(10) Patent No.: US 8,488,041 B2
(45) Date of Patent: Jul. 16, 2013

(54) IMAGE PICKUP DEVICE HAVING ABNORMALITY WARNING FUNCTION BASED ON BRIGHTNESS DISPERSIONS OF TWO PICKED-UP IMAGES, AND WARNING METHOD AND RECORDING MEDIUM FOR THE SAME

(75) Inventors: Mitsuyasu Nakajima, Mizuho-machi (JP); Masaaki Kikuchi, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 220 days.

(21) Appl. No.: 13/018,490

(22) Filed: Feb. 1, 2011

(65) Prior Publication Data
US 2011/0187886 A1    Aug. 4, 2011

(30) Foreign Application Priority Data

Feb. 4, 2010    (JP) ................................ 2010-022901
Jan. 27, 2011    (JP) ................................ 2011-015299

(51) Int. Cl.
*H04N 5/222*      (2006.01)

(52) U.S. Cl.
USPC ...................... 348/333.04; 348/222.1; 348/42; 348/47

(58) Field of Classification Search
USPC .......................................... 348/42–54, 333.04
See application file for complete search history.

(56) References Cited

U.S. PATENT DOCUMENTS

| | | | | |
|---|---|---|---|---|
| 5,553,164 A | * | 9/1996 | Itagaki | 382/232 |
| 6,310,546 B1 | | 10/2001 | Seta | |
| 6,404,484 B1 | * | 6/2002 | Sogawa | 356/3.14 |
| 7,116,816 B2 | * | 10/2006 | Tanaka et al. | 382/149 |
| 7,773,140 B2 | * | 8/2010 | Nakano et al. | 348/312 |
| 2004/0012682 A1 | | 1/2004 | Kosaka et al. | |
| 2004/0022418 A1 | * | 2/2004 | Oota | 382/106 |
| 2008/0317356 A1 | * | 12/2008 | Itoh et al. | 382/209 |

FOREIGN PATENT DOCUMENTS

| | | | |
|---|---|---|---|
| EP | 2148189 A1 | * | 1/2010 |
| JP | 63259442 A | * | 10/1988 |
| JP | 06-003122 A | | 1/1994 |
| JP | 08-047001 A | | 2/1996 |

(Continued)

OTHER PUBLICATIONS

Japanese Office Action dated Dec. 6, 2011 (and English translation thereof) in counterpart Japanese Application No. 2011-015299.

*Primary Examiner* — Roberto Velez
*Assistant Examiner* — Quan Pham
(74) *Attorney, Agent, or Firm* — Holtz, Holtz, Goodman & Chick, P.C.

(57) ABSTRACT

An image pickup control unit displays either one of a picked-up image by a first image pickup unit and a picked-up image by a second image pickup unit on a display unit as a finder image. A feature detecting unit calculates a distribution of brightness values or brightness dispersion for each of the picked-up images by the first and second image pickup units, thereby detecting features of the two picked-up images. A sameness determining unit determines the sameness between both picked-up images based on the detected features, and determines that an abnormality like the unexpected appearance of an obstacle is present when the feature largely differs. When it is determined that an abnormality is present, a warning processing unit simultaneously displays both picked-up images on the display unit, or displays the picked-up image including the abnormality on the display unit as a finder image.

12 Claims, 11 Drawing Sheets

FOREIGN PATENT DOCUMENTS

| | | | | |
|---|---|---|---|---|
| JP | 2000184359 A | * | 6/2000 | |
| JP | 2001-028056 A | | 1/2001 | |
| JP | 2004-040712 A | | 2/2004 | |
| JP | 2007080084 A | * | 3/2007 | |
| JP | 2007147442 A | * | 6/2007 | |
| JP | 2010-114760 A | | 5/2010 | |
| JP | 2010-288253 A | | 12/2010 | |
| JP | 2011-160223 A | | 8/2011 | |

* cited by examiner

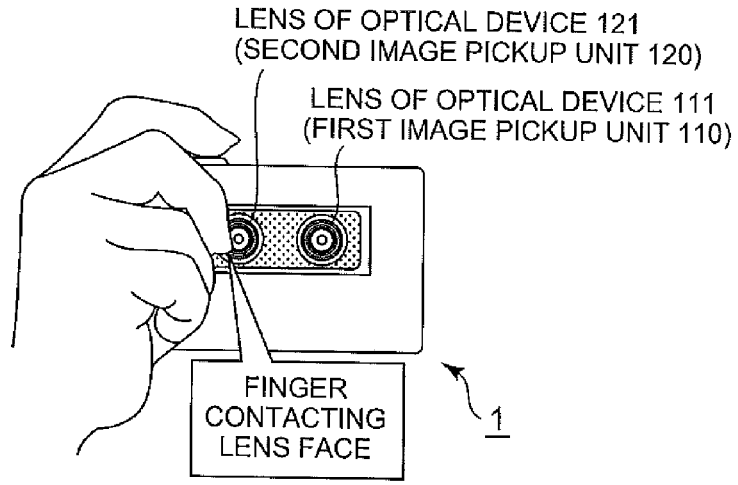
FIG. 5A
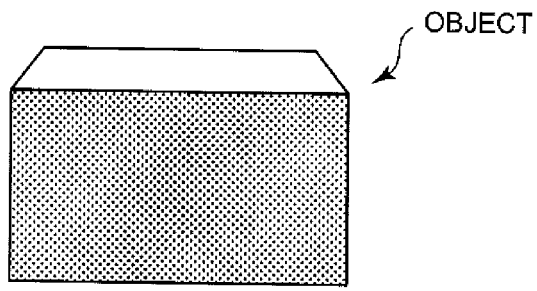
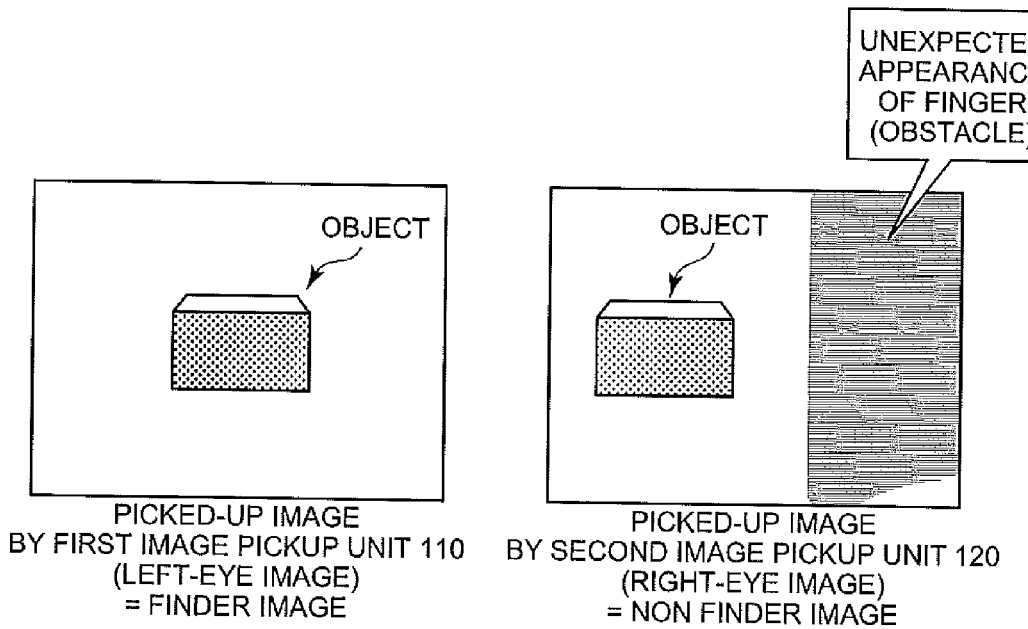
FIG. 5B
FIG. 5C

LEFT-EYE IMAGE THAT IS ORIGINAL FINDER IMAGE

SWITCH TO DISPLAY RIGHT-EYE IMAGE WHERE OBSTACLE IS DETECTED

DIRT OR THE LIKE STICKING TO LENS (OBSTACLE)

OBSTACLE IS PRESENT

WARNING MESSAGE

IMAGE PICKUP DEVICE HAVING ABNORMALITY WARNING FUNCTION BASED ON BRIGHTNESS DISPERSIONS OF TWO PICKED-UP IMAGES, AND WARNING METHOD AND RECORDING MEDIUM FOR THE SAME

CROSS-REFERENCE TO RELATED APPLICATION

This application claims the benefit of Japanese Patent Application No. 2010-022901, filed Feb. 4, 2010 and Japanese Patent Application No. 2011-015299 filed Jan. 27, 2011, the entire disclosure of which is incorporated by reference herein.

FIELD

This application relates generally to an image pickup device, a warning method, and a non-transitory computer-readable recording medium tangibly storing a program, and more particularly, to an image pickup device, a warning method, and a non-transitory computer-readable recording medium tangibly storing a program which are suitable for a stereo camera.

BACKGROUND

There are pantoscopic cameras which are known as stereoscopic cameras having two photo receivers (image pickup units) with respective optical axes at different positions. When an image is picked up through such a stereoscopic camera, right and left images corresponding to a parallax caused when an image is viewed with naked eyes can be obtained. Accordingly, the stereoscopic cameras are used for generating a stereoscopic image (three-dimensional image).

As explained above, a stereoscopic camera has two photo receivers (image pickup units), and when, in particular, such a stereoscopic camera is realized by a compact camera, as a finder image displayed on a rear display panel or an electronic view finder, an image picked up by either one of the image pickup units is often used. In this case, if there is an obstacle nonrelated to the purpose of image pickup, e.g., a finger of a person using the camera which contacts a lens face within an image pickup range where the image pickup unit picks up an image not for the finder, such an obstacle does not appear on the finder image. As a result, a person using the camera does not notice the unexpected appearance of the obstacle, thereby failing to pick up a necessary image or needing to pick up an image again.

SUMMARY

It is an object of the present invention to provide an image pickup device, a warning method, and a non-transitory computer-readable recording medium tangibly storing a program which can cause a person using a camera to notice an unexpected appearance of an obstacle.

In order to achieve the above object, an image pickup device according to a first aspect of the present invention comprises: an image pickup unit that obtains two picked-up images of a same object with respective optical axis positions being different from each other; a finder image selecting unit that selects either one of the two picked-up images as a finder image; a finder display unit that displays the finder image selected by the finder image selecting unit on a finder screen; a feature detecting unit that detects features of the two picked-up images; an abnormality determining unit that determines in which picked-up image in the two picked-up images an abnormality is present based on the features detected by the feature detecting unit; and a warning unit that makes a warning regarding an abnormality when the abnormality determining unit determines that the abnormality is present.

In order to achieve the above object, a warning method according to a second aspect of the present invention is executed by an image pickup device including an image pickup unit that obtains two picked-up images of a same object with respective optical axis positions being different from each other in order to cause a user of the image pickup device to recognize an abnormality in a picked-up image, and the method comprises steps of: selecting either one of the two picked-up images as a finder image; displaying the finder image selected by the finder image selecting unit on a finder screen; detecting features of the two picked-up images; determining in which picked-up image in the two picked-up images an abnormality is present based on the features detected by the feature detecting unit; and making a warning regarding an abnormality when it is determined that the abnormality is present.

In order to achieve the above object, a non-transitory computer-readable recording medium according to a third aspect of the present invention tangibly stores a program that allows a computer of an image pickup device including an image pickup unit that obtains two picked-up images of a same object with respective optical axis positions being different from each other to execute following operations: selecting either one of the two picked-up images as a finder image; displaying the finder image selected by the finder image selecting unit on a finder screen; detecting features of the two picked-up images; determining in which picked-up image in the two picked-up images an abnormality is present based on the features detected by the feature detecting unit; and making a warning regarding an abnormality when it is determined that the abnormality is present.

BRIEF DESCRIPTION OF THE DRAWINGS

A more complete understanding of this application can be obtained when the following detailed description is considered in conjunction with the following drawings, in which:

FIG. 5A is a diagram for explaining a situation expected in an embodiment of the present invention, and showing a positional relationship between the digital camera and an object, and how a finger contacts a lens face;

FIG. 5B is a diagram for explaining a situation expected in the embodiment of the present invention, and showing an example picked-up image by a first image pickup unit;

FIG. 5C is a diagram for explaining a situation expected in the embodiment of the present invention, and showing an example picked-up image by a second image pickup unit;

DETAILED DESCRIPTION

Embodiments of the present invention will be explained below with reference to the accompanying drawings. In the following embodiments, an explanation will be given of an example case in which the present invention is applied to a digital still camera (hereinafter, referred to as a digital camera). It is presumed that a digital camera 1 of the embodiments has the same functions as those of a general digital still camera, but is a so-called pantoscopic camera (stereoscopic camera) having two image pickup structural elements. The digital camera 1 of the embodiments realizes such a configuration of the stereoscopic camera in the form of a compact camera.

Figure 2:
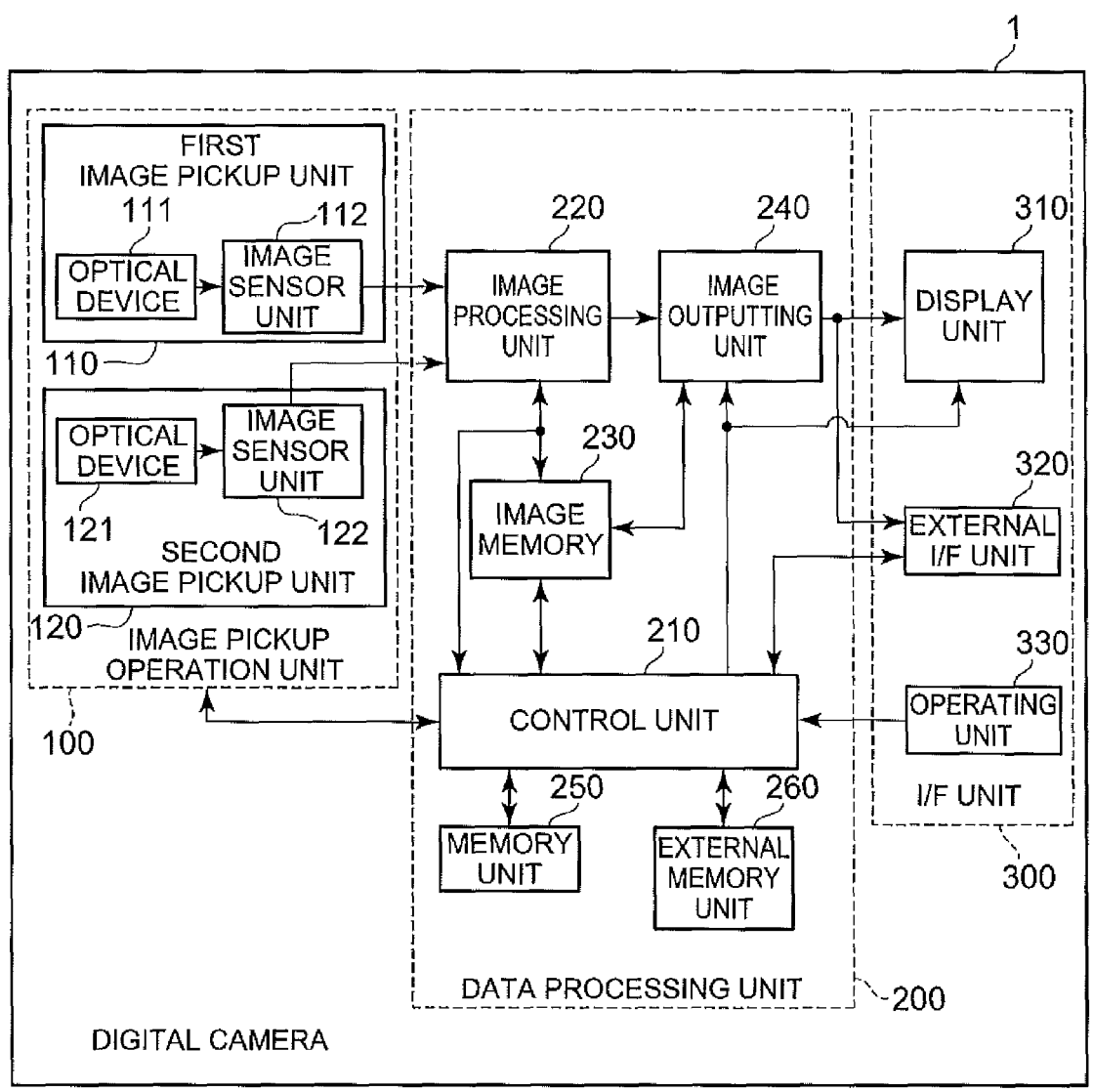
FIG. 2 is a block diagram showing a configuration of the digital camera according to the embodiment of the present invention.

The configuration of such a digital camera 1 will be explained with reference to FIG. 2. FIG. 2 is a block diagram showing a configuration of the digital camera 1 according to an embodiment of the present invention. As shown in the figure, the digital camera 1 of the embodiment generally comprises an image pickup operation unit 100, a data processing unit 200, and an interface (I/F) unit 300.

The image pickup operation unit 100 executes an operation by the digital camera 1 at the time of image pickup, and as shown in FIG. 2, includes a first image pickup unit 110, a second image pickup unit 120, etc.

The first and second image pickup units 110, 120 execute an image pickup operation by the digital camera 1. As explained above, because the digital camera 1 of the embodiment is a stereoscopic camera (a pantoscopic camera), a configuration having the first and second image pickup units 110, 120 is employed, but the first and second image pickup units 110, 120 have the same configuration. Hence, a structural element of the first image pickup unit 110 will be denoted by 110$s$ reference numeral, a structural element of the second image pickup unit 120 will be denoted by 120$s$ reference numeral, and one having the same reference numeral in the single digit is the same structural element.

As shown in FIG. 2, the first image pickup unit 110 (the second image pickup unit 120) includes an optical device 111 (121), an image sensor unit 112 (122), etc.

The optical device 111 (121) includes, for example, a lens, a diaphragm mechanism, a shutter mechanism, and performs optical operation relating to an image pickup. That is, the optical device 111 (121) operates in order to concentrate incoming lights, and adjusts optical elements, such as a focal distance, a diaphragm, and a shutter speed.

The shutter mechanism included in the optical device 111 (121) is a so-called mechanical shutter. When a shutter operation is carried out through merely an operation by an image sensor, the optical device 111 (121) does not need to have the shutter mechanism. Moreover, the optical device 111 (121) operates under a control by a control unit 210 to be discussed later.

The image sensor unit 112 (122) comprises an image sensor (e.g., a CCD (Charge Coupled Device), a CMOS (Complementary Metal Oxide Semiconductor), etc.), which generates an electrical signal in accordance with incoming light concentrated by the optical device 111 (121). The image sensor unit 112 (122) performs photoelectric conversion, thereby generating an electrical signal in accordance with received light, and outputs the electrical signal to the data processing unit 200.

As explained above, the first and second image pickup units 110, 120 have the same configuration. More specifically, individual specifications, such as a focal distance f or a value F of the lens, a diaphragm range of the diaphragm mechanism, the size, the number of pixels, the arrangement, the pixel area of the image sensor are all same.

Figure 1:
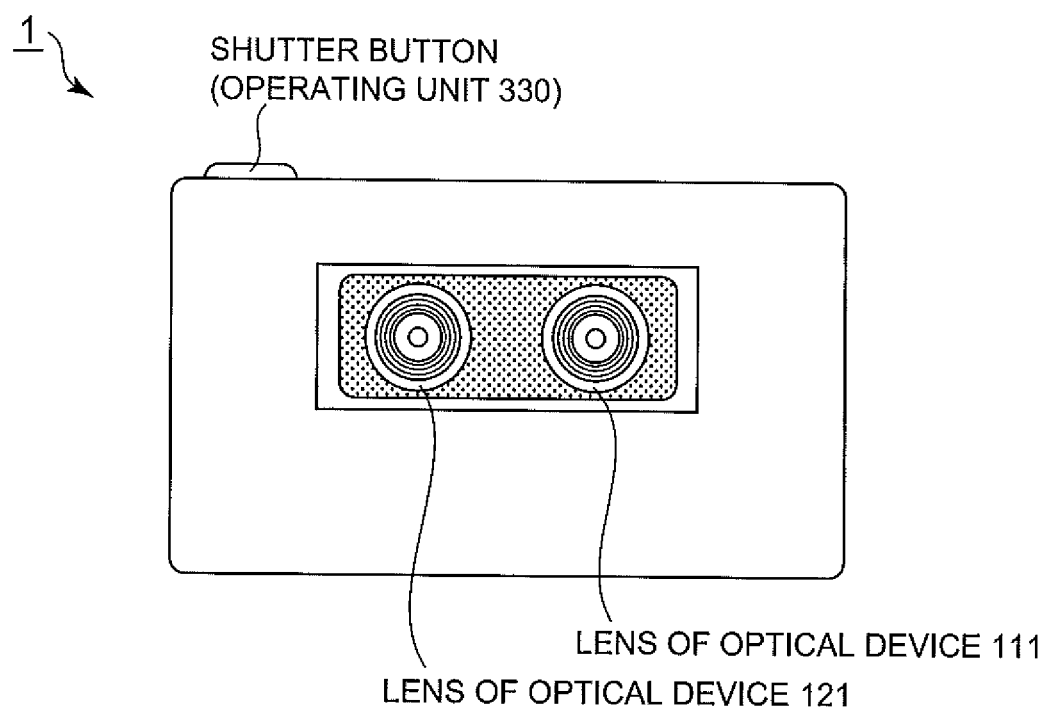
FIG. 1 is a diagram showing an external configuration of a digital camera according to an embodiment of the present invention.

As shown in FIG. 1, the digital camera 1 having such first and second image pickup units 110, 120 employs a structure that a lens of the optical device 111 and that of the optical device 121 are formed on the same plane in the external face of the digital camera 1.

It is presumed that when the digital camera 1 is brought to a level in a direction at which the shutter button is positioned upwardly, the two lenses (photo receivers) are arranged so that respective center positions are on the same straight line in the horizontal direction. That is, when the first image pickup unit 110 and the second image pickup unit 120 are simultaneously actuated, images of the same object are picked up, but those images have respective optical-axis positions shifted laterally.

According to the embodiment, as shown in FIG. 1, the lens (the optical device 111) of the first image pickup unit 110 is positioned at the left of an object, and the lens (the optical device 121) of the second image pickup unit 120 is positioned at the right of the object. The distance between the first and second image pickup units 110, 120 is adjusted so that the misalignment between respective optical-axis positions corresponds to a parallax when an object is viewed with naked eyes. According to such a configuration, the first image pickup unit 110 picks up a picked-up image (a left-eye image) corresponding to the viewing field of the left eye, and the second image pickup unit 120 picks up a picked-up image (a right-eye image) corresponding to the viewing field of the right eye. Right and left images obtained by the digital camera 1 that is the stereoscopic camera are used to generate a stereoscopic image utilizing a parallax.

In the present embodiment, such right and left images with a parallax obtained by simultaneous activation of the first and second image pickup units 110, 120 are referred to as a "stereoscopic image", and an operation mode for obtaining such a stereoscopic image is referred to as a "stereoscopic image pickup mode". When it is not intended to obtain a stereoscopic image, either one of the first image pickup unit 110 or the second image pickup unit 120 may be driven in order to obtain a normal picked-up image. In this case, an operation mode other than the stereoscopic image pickup mode is to be selected.

Returning now to FIG. 2, the explanation for the configuration of the digital camera 1 is continued.

The data processing unit 200 processes electrical signals generated by image pickup operations by the first and second image pickup units 110, 120, generates digital data representing a picked-up image, and performs image processing on the picked-up image. As shown in FIG. 2, the digital data processing unit 200 includes, the control unit 210, an image processing unit 220, an image memory 230, an image outputting unit 240, a memory unit 250, an external memory unit 260, etc.

The control unit 210 comprises, for example, a processor like a CPU (Central Processing Unit), and a main memory device (memory) like a RAM (Random Access Memory), and controls individual unit of the digital camera 1 by running a program stored in the memory unit 250 to be discussed later. In the present embodiment, the control unit 210 realizes various functions of individual processes to be discussed later by running a predetermined program. In the present embodiment, the control unit 210 executes various operations related to individual processes to be discussed later, but an exclusive processor independent from the control unit 210 may execute such operations.

The image processing unit 220 comprises, for example, an ADC (Analog/Digital Converter), a buffer memory, a processor exclusive for image processing (i.e., a so-called image processing engine), and generates digital data representing a picked-up image based on each of the electrical signals generated by the image sensor units 112, 122.

That is, the ADC converts an analog electrical signal output by the image sensor unit 112 (122) into a digital signal, and successively stores such digital signals in the buffer memory, and, the image processing engine performs a so-called developing process or the like on buffered digital data, thereby adjusting an image quality, compressing the data, etc.

The image memory 230 comprises, for example, a memory device, such as a RAM or a flash memory, and temporarily stores picked-up image data generated by the image processing unit 220, image data processed by the control unit 210, etc.

The image outputting unit 240 comprises, for example, an RGB signal generating circuit, converts image data stored in the image memory 230 into RGB signals, and outputs such signals to a display screen (e.g., a display unit 310 to be discussed later).

The memory unit 250 comprises a memory device, such as a ROM (Read Only Memory) or a flash memory, and stores programs and data necessary for the operation of the digital camera 1. In the present embodiment, the memory unit 250 stores an operation program executed by the control unit 210, and parameters and operation expressions necessary for processing.

The external memory unit 260 comprises a detachable memory device from the digital camera 1 like a memory card, and stores image data picked up by the digital camera 1.

The interface unit 300 is an interface between the digital camera 1 and a user or an external device, and as shown in FIG. 2, comprises the display unit 310, an external interface (I/F) unit 320, an operating unit 330, etc.

The display unit 310 comprises, for example, a liquid crystal display device, and displays/outputs various screens necessary for operating the digital camera 1, a live-view image (a finder image) at the time of image pickup, a picked-up image, etc. In the present embodiment, a picked-up image or the like is displayed/output based on image signals (RGB signals) from the image outputting unit 240.

The external interface unit 320 comprises, for example, a USB (Universal Serial Bus) connector, and a video output terminal, transfers image data to an external computer device, and displays/outputs a picked-up image on an external monitor device.

The operating unit 330 comprises various buttons arranged on the external face of the digital camera 1, generates an input signal in accordance with an operation given by the user of the digital camera 1, and inputs such a signal into the control unit 210. Examples of such a button of the operating unit 330 are a shutter button for instructing a shutter operation, a mode button for selecting the operation mode of the digital camera 1, a cross key for various settings, and a function button for various settings.

In the present embodiment, as the control unit 210 runs the operation program stored in the memory unit 250, individual processes to be discussed later are executed, and functions realized by the control unit 210 in this case will be explained with reference to FIG. 3.

Figure 3:
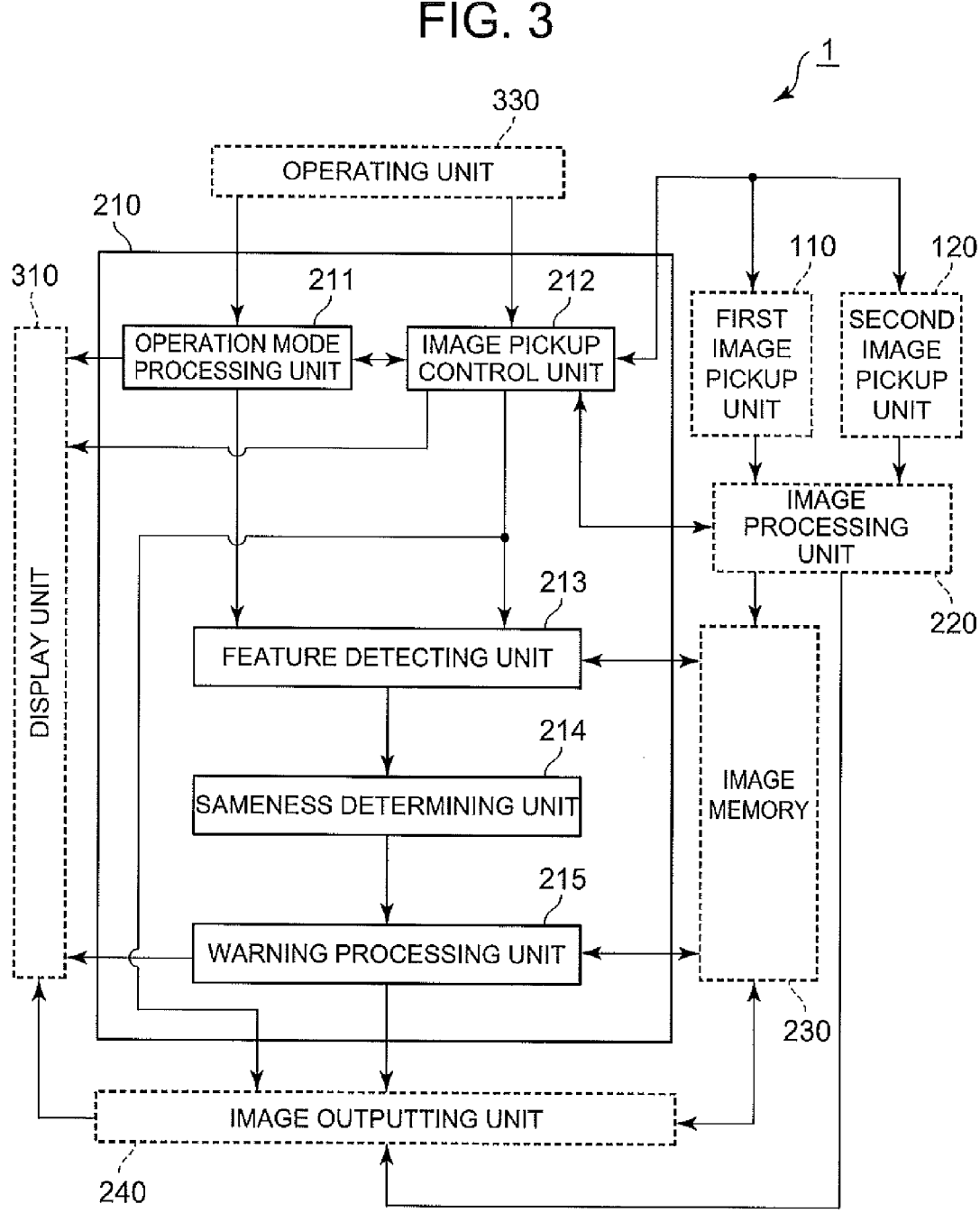
FIG. 3 is a functional block diagram showing a function realized by the control unit shown in FIG. 2.

FIG. 3 is a functional block diagram showing a function realized by the control unit 210. Shown in this figure are necessary functional configurations to realize a function of warning the user of the digital camera 1 about the unexpected appearance of an obstacle at the time of stereoscopic image pickup together with a function of performing stereoscopic image pickup operation. In this case, as shown in the figure, the control unit 210 functions as an operation mode processing unit 211, an image pickup control unit 212, a feature detecting unit 213, a sameness determining unit 214, a warning processing unit 215, etc.

The operation mode processing unit 211 displays a screen necessary for allowing the user of the digital camera 1 to specify various operation modes of the digital camera 1, and displays a setting screen for each operation mode while working together with the display unit 310. Moreover, the operation mode processing unit 211 recognizes the operation mode specified by the user, reads a program and operation expressions necessary for executing the operation mode from the memory unit 250, and loads those programs and operation expressions in the main memory device (the memory) of the control unit 210 while working together with the operating unit 330.

In the present embodiment, it is presumed that the user specifies the operation mode (the stereoscopic image pickup mode) for performing stereoscopic image pickup operation. Individual functional configurations by the control unit 210 to be discussed later are realized upon execution of the program loaded by the operation mode processing unit 211 in accordance with the selection of the stereoscopic image pickup mode.

The image pickup control unit 212 executes the image pickup operation by the digital camera 1 by controlling the first and second image pickup units 110, 120, the image outputting unit 240, etc. In this case, the image pickup control unit 212 executes various processes and control relating to an image pickup operation, such as photometry, zooming, focusing, automatic exposure, and screen display at the time of image pickup, which are carried out by a general digital camera.

When the stereoscopic image pickup mode is selected, the image pickup control unit 212 simultaneously controls the first and second image pickup units 110, 120 so as to have the same operation. In this case, either one of the image pickup units (e.g., the first image pickup unit 110) may execute the above-explained various operations relating to image pickup, and the other image pickup unit (e.g., the second image pickup unit 120) may work together based on the parameters (e.g., a focal distance, an exposure) obtained by the operation of the one image pickup unit.

It is presumed that the display unit 310 displays a finder image at the time of image pickup, but such a finder image is a live-view image obtained by the image pickup operation by either one of the first and second image pickup units 110, 120. In the present embodiment, the live-view image obtained by the first image pickup unit 110 is displayed on the display unit 310 as the finder image. In this case, as the image pickup control unit 212 controls the image outputting unit 240, the live-view image obtained by the operation by the first image pickup unit 110 is displayed on the display unit 310.

The feature detecting unit 213 detects a feature appearing on an image from respective picked-up images obtained by both first and second image pickup units 110, 120. For example, the feature detecting unit 213 obtains a histogram (e.g., a brightness histogram and a color histogram) of each picked-up image, a brightness dispersion of each picked-up image, and calculates a spatial frequency of each picked-up image, thereby detecting a feature. Such detecting operations are carried out through conventionally well-known image processing technologies.

The sameness determining unit 214 determines the sameness between the picked-up images obtained by the first and second image pickup units 110, 120 based on the feature detected by the feature detecting unit 213. That is, when a stereoscopic image is picked up by the digital camera 1, images of the same object are picked up by the first and second image pickup units 110, 120, so that there is no large difference between those obtained picked-up images except the optical-axis positions, and it is presupposed that the feature detected from each picked-up image is substantially same. Hence, based on the difference between the features detected by the feature detecting unit 213, the sameness determining unit 214 determines, for example, whether or not there is unnecessary unexpected appearance of an obstacle in the picked-up image, whether or not there is the sameness needing for generation of a stereoscopic image, etc.

When there is a large difference between the features detected by the feature detecting unit 213, it is possible for the sameness determining unit 214 to determine that there is an obstacle appearing in the picked-up image obtained by either one of the image pickup units. In the present embodiment, because the live-view image obtained by the first image pickup unit 110 is used as the finder image, even if an obstacle appears in the picked-up image by the second image pickup unit 120, the user of the digital camera 1 cannot recognize such an obstacle. In the present embodiment, it is expected that as an obstacle, a finger of the user of the digital camera 1 appears in the image because the finger contacts the lens face of the second image pickup unit 120, and a dirt appears in the image because the dirt sticks to the lens face of the second image pickup unit 120.

Moreover, when the object image largely differs between the first image pickup unit 110 and the second image pickup unit 120 because the distance to the object is too close, it is difficult to generate an appropriate stereoscopic image from obtained right and left images. Hence, according to the present embodiment, the sameness determining unit 214 determines whether or not an image pickup condition matches such a case or whether or not there is an unexpected appearance of an obstacle as explained above. Based on the difference obtained by comparing the features of individual images detected by the feature detecting unit 213, the sameness determining unit 214 determines whether or not there is the sameness in an allowable range, thereby determining whether or not there is an abnormality on the picked-up image.

The warning processing unit 215 executes a warning process in order to cause the user of the digital camera 1 to recognize there is an abnormality like an unexpected appearance of an obstacle when the sameness determining unit 214 determines that the sameness between the picked-up image obtained by the first image pickup unit 110 and the picked-up image obtained by the second image pickup unit 120 is out of an allowable range. In such a process, the image outputting unit 240 and the display unit 310 are controlled in order to display a warning message, and to change a source of the finder image displayed on the display unit 310, thereby causing the user of the digital camera 1 to recognize that there is an abnormality like an unexpected appearance of an obstacle.

The above-explained function is the function realized by the control unit 210. In the present embodiment, it is presumed that a logical process by the control unit 210 that runs the program realizes the above-explained individual functions. However, those functions may be realized by a hardware configuration like an ASIC (Application Specific Integrated Circuit). In this case, a function relating to the image processing among all functions shown in FIG. 3 may be realized by the image processing unit 220.

The above-explained configuration of the digital camera 1 is the necessary configuration in order to embody the present invention, and the basic function and various additional functions of the digital camera are employed as needed.

An explanation will now be given of an operation by the digital camera 1 having the above-explained configuration. Below is an example case in which the above-explained "stereoscopic image pickup mode" among the operation modes of the digital camera 1 is selected.

First Example

An explanation will be given of a "first stereoscopic image pickup process" which is executed upon selection of the corresponding operation mode according to this example with reference to the flowchart shown in FIG. 4.

Upon starting of the process, the image pickup control unit 212 controls the image pickup operation unit 100, which starts actuation of the first and second image pickup units 110, 120 (step S10), thereby starting up the image pickup operation by each image pickup unit. In the present embodiment, the "stereoscopic image pickup mode" is for picking up a stereoscopic image as a still image, and the image pickup operation started in the step S10 is an image pickup operation of a finder image.

Picked-up images obtained by respective operations by the first and second actuated image pickup units 110, 120 are processed by the image processing unit 220, two live-view images are stored in the image memory 230, and are input into the control unit 210. That is, live-view images corresponding to right and left images are obtained (step S11).

As explained above, in the present embodiment, the live-view image obtained by the first image pickup unit 110 is used as a finder image, and as the image pickup control unit 212 controls the image processing unit 220 and the image outputting unit 240, the live-view image picked up by the first image pickup unit 110 is displayed (finder display) on the display unit 310 (step S12).

In the present embodiment, it is presumed that when an image of an object is picked up by the digital camera 1, a finger of the user of the digital camera 1 contacts the lens configuring the optical device 121 of the second image pickup unit 120 as shown in FIG. 5A. In this case, a live-view image (a left-eye image) picked up by the first image pickup unit 110 becomes one shown in FIG. 5B, and such an image is displayed on the display unit 310 as a finder image.

In contrast, a live-view image (a right-eye image) picked up by the second image pickup unit 120 where a finger contacts the lens face has, for example, as shown in FIG. 5C, the unexpected appearance of the finger. A stereoscopic image according to the present embodiment is used for generating a three-dimensional image, so that it is improper if there is a large difference between the left-eye image and the right-eye image other than the misalignment of the optical-axis position. Hence, the unexpected appearance of the finger in the right-eye image shown in FIG. 5C is an obstacle for a stereoscopic image.

However, the display unit 310 displays a finder image that is the left-eye image shown in FIG. 5B, and no right-eye image (a non-finder image) is displayed on the display unit 310. Accordingly, it is difficult for the user of the digital camera 1 to recognize such an unexpected appearance of the obstacle as shown in FIG. 5C.

Figure 6:
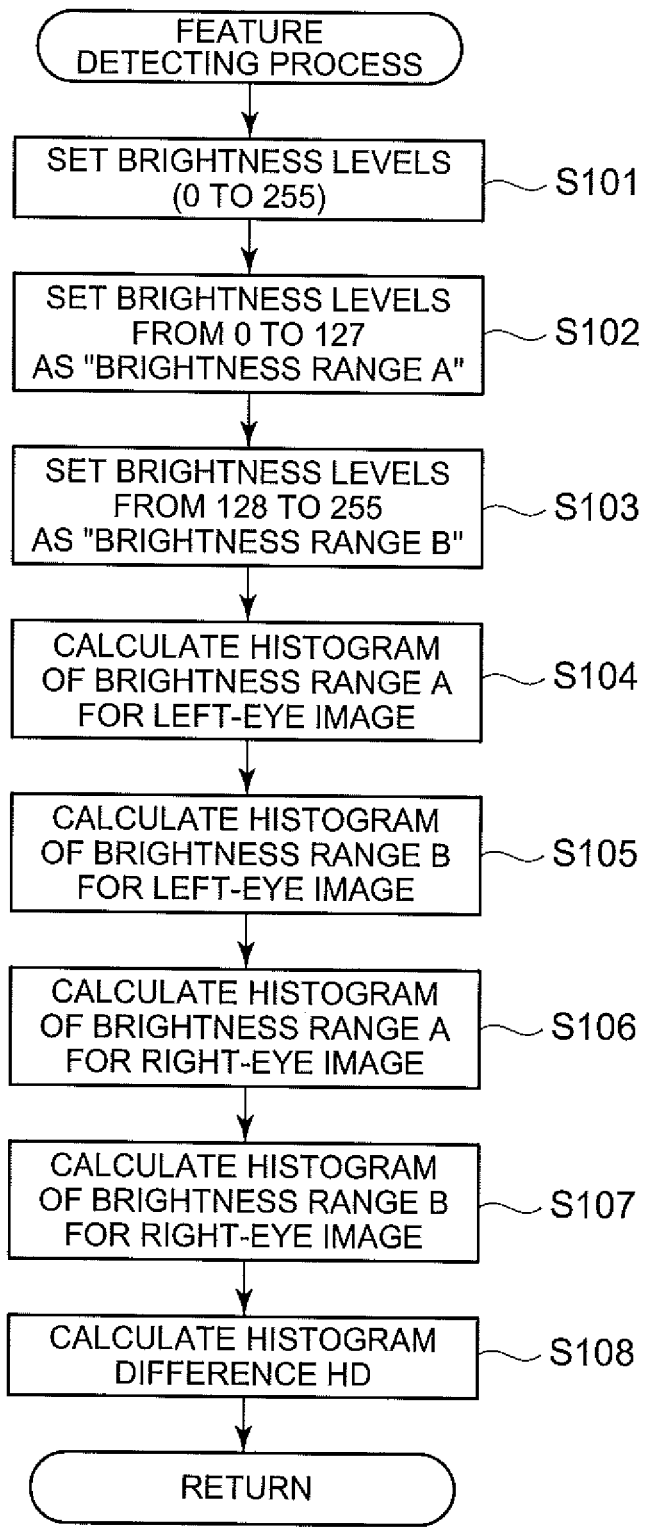
FIG. 6 is a flowchart for explaining a "feature detecting process" executed in the "first stereoscopic image pickup process" shown in FIG. 4.

In order to cause the user of the digital camera 1 to recognize such an unexpected appearance of the obstacle, it is necessary to detect occurrence of an abnormality. In the present embodiment, an abnormality is detected based on the features of the right and left images, and the "feature detecting process" for detecting a feature is executed (step S100). This "feature detecting process" will be explained with reference to the flowchart of FIG. 6.

Upon starting of the process, the feature detecting unit 213 sets a brightness level in the whole picked-up image (step S101). In the present embodiment, the brightness of the image is processed by 8 bits, and the brightness level is expressed by values from 0 to 255. In this case, it is presumed that the brightness value 0 represents the minimum brightness and the brightness value 255 represents the maximum brightness in the present embodiment. It is fine if such brightness level is set and prescribed beforehand, and in this case, the step S101 can be skipped.

According to the present embodiment, based on the brightness level, an abnormality like the unexpected appearance of an obstacle is detected. That is, the brightness of the left-eye image is compared with that of the right-eye image, and the sameness between those images is determined based on the difference in the brightness. However, when there is no unexpected appearance of an obstacle, if the optical-axis position is misaligned, both images are not completely same, and the brightness level becomes different. Hence, if a strict comparison based on the whole brightness values is made, such an error is also detected, and the process load increases. Therefore, according to the present embodiment, for example, if the brightness level is divided into two groups at the center value, the detection precision is made appropriate and the process load is reduced.

In this case, according to the present embodiment, a range of the brightness values from 0 to 127 (a low brightness side) among the brightness levels 0 to 255 is defined as a "brightness range A" (step S102), and a range of the brightness values from 128 to 255 (a high brightness side) is defined as a "brightness range B" (step S103). The brightness range may be set and prescribed beforehand, and in this case, the steps S102 to S103 can be skipped.

The feature detecting unit 213 calculates a histogram representing the brightness frequency in each brightness range for each of the right and left images. More specifically, the feature detecting unit 213 calculates a histogram for the brightness range A in the left-eye image, a histogram for the brightness range B in the left-eye image, a histogram for the brightness range A in the right-eye image, and a histogram for the brightness range B in the right-eye image (steps S104 to S107).

The "histogram" in this case represents a frequency (a distribution) of corresponding pixels, and the feature detecting unit 213 calculates each histogram through a conventionally well-known histogram generating technology that is carried out in a general image processing.

Figure 7A:
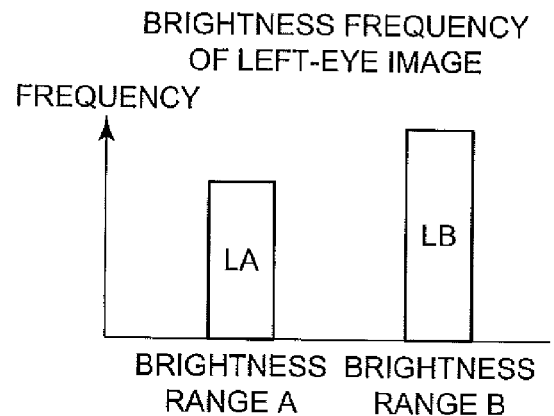
FIG. 7A is a diagram for explaining the content of a process according to the first example of the present invention, and showing an example brightness frequency of a left-eye image calculated through the "feature detecting process"
Figure 7B:
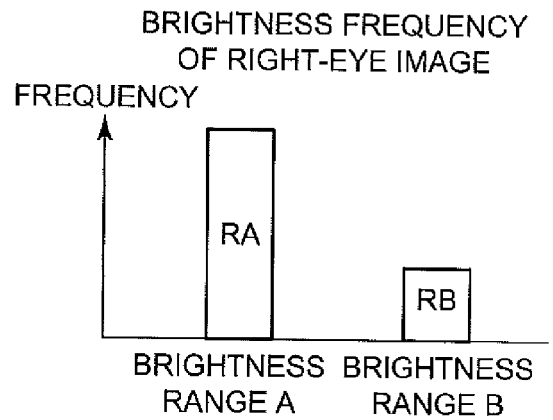
FIG. 7B is a diagram for explaining the content of a process according to the first example of the present invention, and showing an example brightness frequency of a right-eye image calculated through the "feature detecting process"

FIGS. 7A and 7B show an example case in which histograms are calculated from picked-up images shown in FIGS. 5B and 5C. FIG. 7A shows an example histogram (a brightness frequency) calculated for the left-eye image, and a number of pixels corresponding to the brightness range A is denoted as "LA", while the number of pixels corresponding to the brightness range B is denoted as "LB". Moreover, FIG. 7B shows an example histogram (a brightness frequency) calculated for the right-eye image, and the number of pixels corresponding to the brightness range A is denoted as "RA", while the number of pixels corresponding to the brightness range B is denoted as "RB".

In this case, as shown in FIG. 5C, because the right-eye image has the unexpected appearance of a contacting finger, as shown in FIG. 7B, for example, there is a tendency that the number of pixels RA corresponding to the brightness range A at the low brightness side is relatively large, and the number of pixels RB corresponding to the brightness range B at the high brightness side is relatively small. The feature of such a brightness distribution largely differs from that of the histogram (see FIG. 7A) for the left-eye image where no abnormality like the unexpected appearance of an obstacle is caused.

Therefore, the difference between respective histograms of the right and left images is taken, and is compared with a predetermined threshold, thereby enabling distinction of a difference between the right and left images originating from the unexpected appearance of an obstacle. In the present embodiment, the sameness determining unit 214 calculates a difference based on the number of pixels indicated by each histogram calculated by the feature detecting unit 213 (step S108).

In this example, the sameness determining unit 214 calculates, for example, following equation 1 in order to obtain a histogram difference HD between the right and left images.

$$HD = (LA-RA) \times (LA-RA) + (LB-RB) \times (LB-RB) \quad \text{Equation 1}$$

Figure 4:
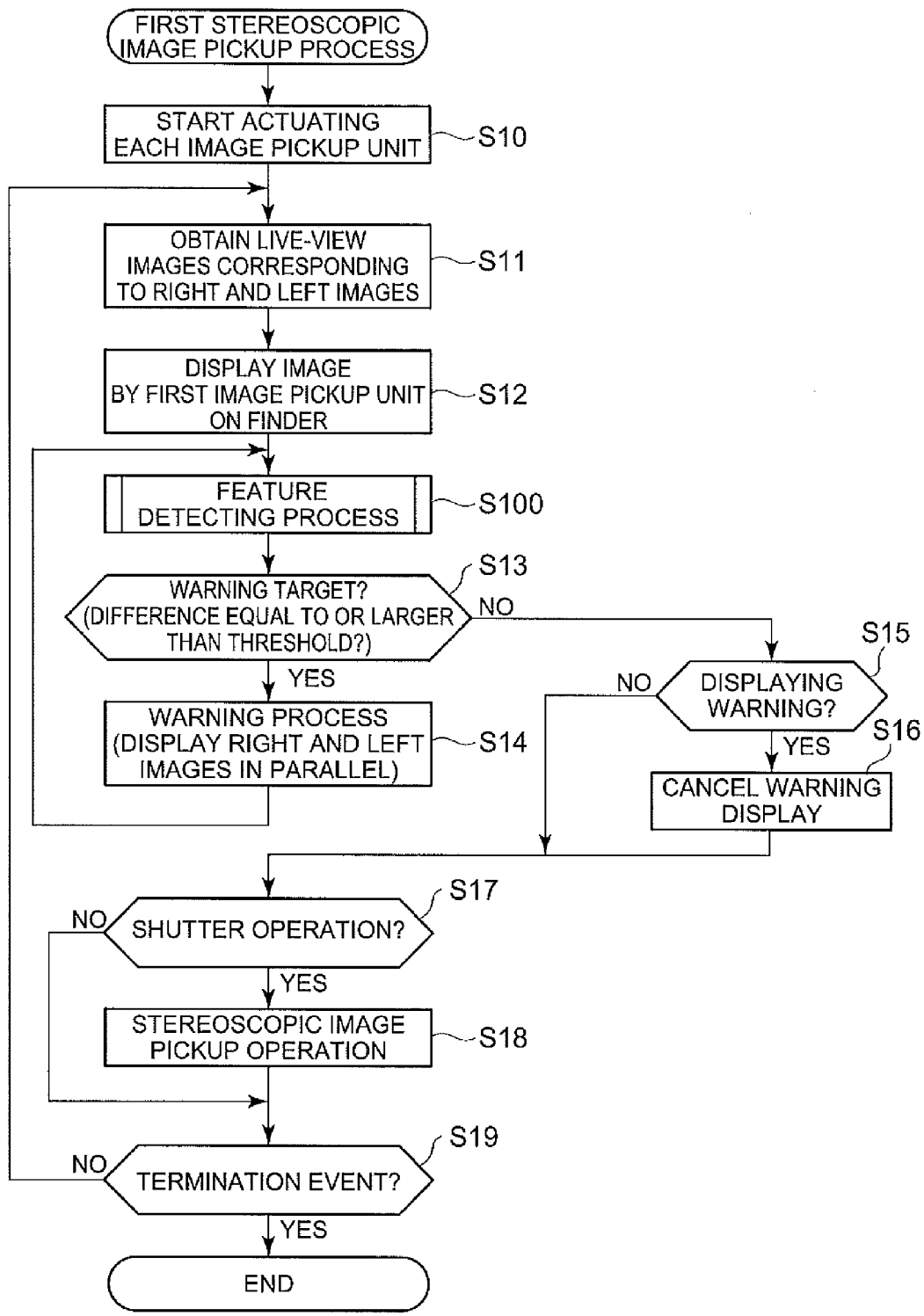
FIG. 4 is a flowchart for explaining a "first stereoscopic image pickup process" according to a first example of the present invention.

When such an HD is calculated, the "feature detecting process" is terminated, and the process returns to the flow of the "first stereoscopic image pickup process" (see FIG. 4).

In the "first stereoscopic image pickup process", the sameness determining unit 214 compares the difference HD calculated in the step S108 of the "feature detecting process" with a predetermined threshold TH, thereby determining whether or not the image is a warning target (step S13). The threshold TH is a value obtained through, for example, a test carried out by the manufacturer of the digital camera 1, and the minimum value or the like of the difference HD which appears when the unexpected appearance of an expectable obstacle happens in either one of the image pickup units is set as the threshold TH beforehand.

In this case, the sameness determining unit 214 determines that the sameness between right and left images is out of the allowable range when the difference HD calculated in the step S108 is equal to or larger than the threshold TH, and determines that there is the unexpected appearance of an obstacle in either one of the picked-up images, thereby making such an image as a warning target (step S13: YES).

When determining that such an image is a warning target, the sameness determining unit 214 gives a notification to that effect to the warning processing unit 215. In this case, the warning processing unit 215 executes a warning process for allowing the user of the digital camera 1 to recognize that there is an abnormality like the unexpected appearance of an obstacle in either one of the right and left images (step S14).

Figure 7C:
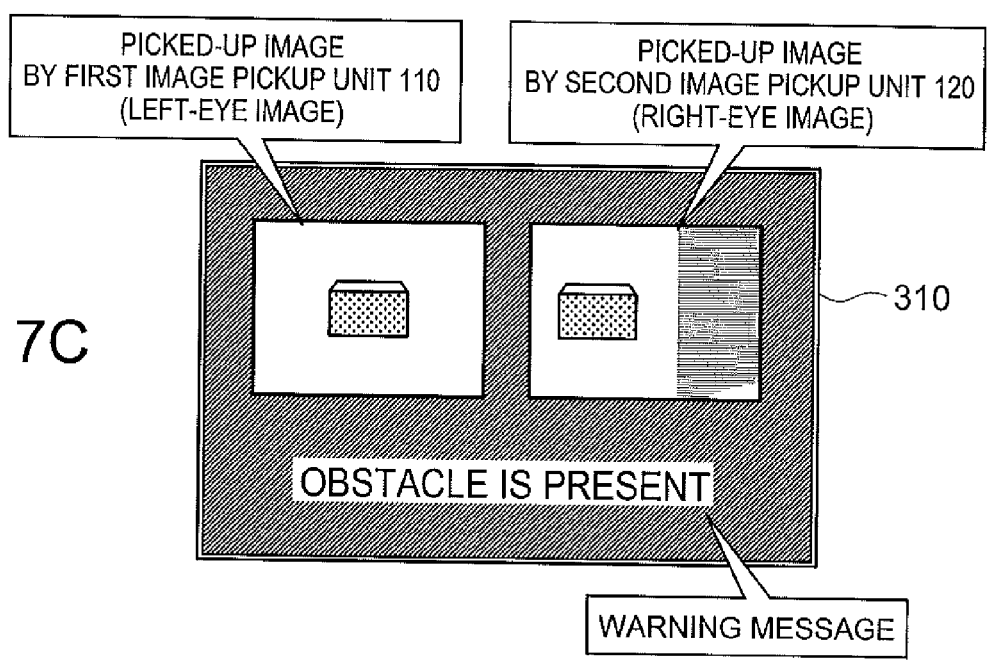
FIG. 7C is a diagram for explaining the content of a process according to the first example of the present invention, and showing an example way of displaying a warning in the "first stereoscopic image pickup process"

In this case, by controlling the image outputting unit 240, the warning processing unit 215 displays, as shown in FIG. 7C, not only the live-view image (the left-eye image) by the first image pickup unit 110 but also the live-view image (the right-eye image) by the second image pickup unit 120 in parallel on the display unit 310 so that the user of the digital camera 1 can view both images simultaneously.

It is expected in the present embodiment that the unexpected appearance of an obstacle occurs in the picked-up image by the second image pickup unit 120, so that such a parallel image display allows the user of the digital camera 1 to recognize that there is an abnormality in the right-eye image by the second image pickup unit 120.

Moreover, as shown in FIG. 7C, a warning message to the effect that the unexpected appearance of an obstacle is occurring may be displayed. As explained above, when the two live-view images are displayed in parallel, each image is displayed so as to be scaled down from the original finder image, so that the user may be unable to visually recognize the unexpected appearance of an obstacle and to figure out the warning. However, by displaying such a message together with images, it is possible for the user of the digital camera 1 to further surely recognize the warning.

Upon executing of the warning process, the feature detecting process is executed again (step S100), and it is determined whether or not an image is a warning target (step S13). If the user of the digital camera 1 recognizes such an unexpected appearance of an obstacle through the warning display, the user takes an action so that the obstacle becomes not to appear. When the reason which causes a difference between the right and left images is eliminated, the image is not determined as a warning target (step S13: NO).

In this case, when the warning display shown in FIG. 7C is made in the warning process in the step S14 (step S15: YES), the warning processing unit 215 cancels such a warning display (step S16). In this case, the warning processing unit 215 controls the image outputting unit 240 so that the live-view image by the first image pickup unit 110 is displayed on the display unit 310 as a finder image like the initial condition.

When the image display becomes a normal finder screen in this fashion, in response to an operation of the shutter button of the operating unit 330 (step S17: YES), the image pickup control unit 212 controls the image pickup operation unit 100 so that a stereoscopic image pickup operation is carried out (step S18).

Next, if no predetermined termination event (e.g., releasing of the "stereoscopic image pickup mode", power off of the digital camera 1, etc.,) occurs (step S19: NO), the processes of the step S11 and steps subsequent to the step S11 is repeated, so that the stereoscopic image pickup operation is continued, and when a predetermined termination event occurs, the process is terminated (step S19: YES).

Through the above-explained processes, when the unexpected appearance of an obstacle occurs in an image by the image pickup unit not used as a finder image in a stereoscopic camera, respective images of the two image pickup units are simultaneously displayed in order to warn the user of the camera, so that the user of the camera can recognize the occurrence of an abnormality.

In the "feature detecting process" (step S100) in the above-explained embodiment, the feature is detected based on brightness histograms of right and left images in order to determine the sameness, but as long as the sameness can be determined, how to detect a feature is optional, and for example, a feature may be detected based on a color histogram (an RGB histogram). In this case, for example, by using a color histogram for a specific color (e.g., G) among RGB, the process load of the feature detection can be reduced.

Second Example

In the first example, determination is made based on whether or not there is a difference equal to or larger than a certain value between respective features of right and left images. Accordingly, it is difficult to specify by which image pickup unit the image where an obstacle unexpectedly appears is generated. Hence, according to the first example, the user of the digital camera 1 is caused to recognize an abnormality by simultaneous display of both images.

If it is possible to specify by which image pickup unit the image where the obstacle unexpectedly appears is generated, the user is allowed to recognize such an abnormality by, for example, switching of a finder image to the image by that image pickup unit, so that the user of the digital camera 1 can further surely recognize such an obstacle. In this example, an example process for realizing such an operation will be explained.

Figure 8:
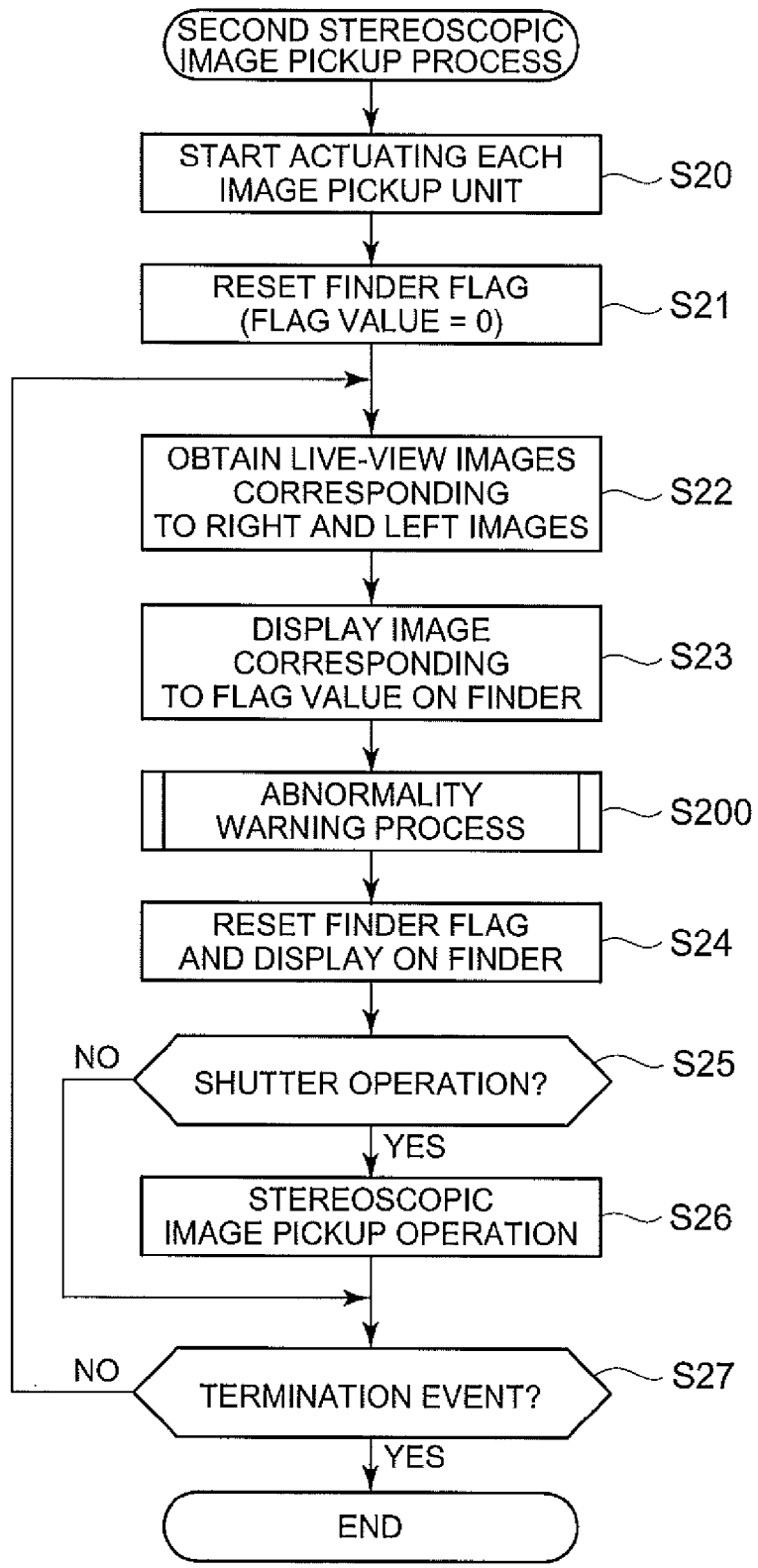
FIG. 8 is a flowchart for explaining a "second stereoscopic image pickup process" according to a second example.

A "second stereoscopic image pickup process" of this example will be explained with reference to the flowchart of FIG. 8. The "second stereoscopic image pickup process" will be started upon selection of the "stereoscopic image pickup mode" like the "first stereoscopic image pickup process" exemplified in the first example.

Upon starting of the process, the image pickup control unit 212 controls the image pickup operation unit 100, actuation of the first and second image pickup units 110, 120 is started (step S20), and each image pickup unit starts the image pickup operation.

The image pickup control unit 212 resets a flag (a finder flag) indicating by which image pickup unit the image is used as the finder image (step S21). The value of the finder flag can be "0" or "1", and the value "0" indicates that the live-view image by the first image pickup unit 110 is used as a finder image, while the value "1" indicates that the live-view image by the second image pickup unit 120 is used as the finder image.

Picked-up images obtained by respective operations of the driven first and second image pickup units 110, 120 are processed by the image processing unit 220, the two live-view images are stored in the image memory 230, and are input to the control unit 210. That is, live-view images corresponding to the right and left images are obtained (step S22).

The image pickup control unit 212 controls the image outputting unit 240, and causes an image corresponding to the set flag value as the present finder flag to be displayed on the display unit 310 (step S23). Because the finder flag is once reset in the step S21, the live-view image by the first image pickup unit 110 is displayed on the display unit 310 as the finder image.

Figure 9:
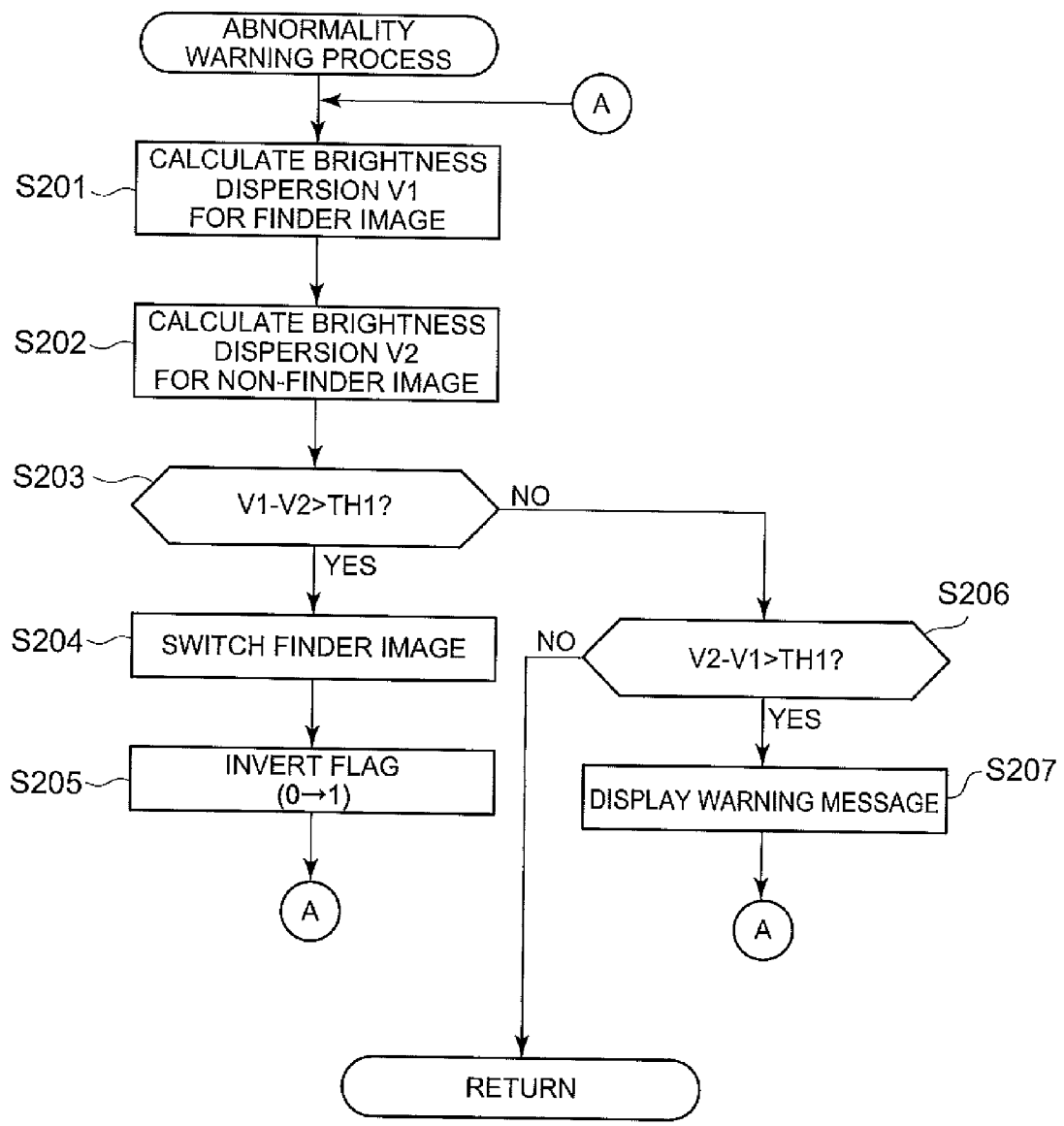
FIG. 9 is a flowchart for explaining an "abnormality warning process" executed in the "second stereoscopic image pickup process" shown in FIG. 8.

When stereoscopic image pickup is enabled thus way, an "abnormality warning process" for causing the user of the digital camera 1 to recognize that an abnormality like the unexpected appearance of an obstacle occurs is executed (step S200). The "abnormality warning process" will now be explained with reference to the flowchart shown in FIG. 9.

Upon starting of the process, the feature detecting unit 213 calculates a brightness dispersion V1 for a finder image (step S201). Because the flag value of the present finder flag is "0" at this stage, the feature detecting unit 213 calculates a brightness dispersion for the live-view image (the left-eye image) by the first image pickup unit 110. The feature detecting unit 213 calculates following equation 2 with the brightness value of the left-eye image being p1(x, y), thereby calculating the brightness dispersion V1 for the left-eye image.

$$V1=\Sigma\Sigma(p1(x,y)-\text{mean}(p1))^2 \quad \text{Equation 2}$$

In the equation 2, the symbol $\Sigma$ means a summation, and each of such a symbol has a whole range of the left-eye image in the x or y direction. Moreover, mean means an average, and mean(p1) means the average brightness of the left-eye image. Furthermore, ^ indicates an exponential.

Next, the feature detecting unit 213 calculates a brightness dispersion likewise for the image (non-finder image) not used as the finder image, i.e., the live-view image (the right-eye image) by the second image pickup unit 120. The feature detecting unit 213 calculates a brightness dispersion V2 in this case from following equation 3. p2(x, y) in the equation means the brightness value of the right-eye image, and other elements are same as those of equation 2.

$$V2=\Sigma\Sigma(p2(x,y)-\text{mean}(p2))^2 \quad \text{Equation 3}$$

As shown in FIG. 5A, for example, when the finger of the user of the digital camera 1 is contacting the lens face or when a dirt is sticking on the lens face, incoming light into the image pickup unit is partially blocked, and an image obtained under this condition has a tendency that the brightness dispersion obtained as explained above becomes small.

Hence, by comparing respective brightness dispersions between the right and left images, it is possible to determine in which image an abnormality is occurring when the unexpected appearance of an obstacle occurs. Therefore, the sameness determining unit 214 compares the brightness dispersion V1 of the finder image (the left-eye image) with the brightness dispersion V2 of the non-finder image (the right-eye image) both calculated by the feature detecting unit 213.

Because the left-eye image by the first image pickup unit 110 is displayed as a finder image, the sameness determining unit 214 first determines whether or not the unexpected appearance of an obstacle occurs in the right-eye image by the second image pickup unit 120, which cannot be recognized through the finder screen. In this case, the sameness determining unit 214 determines whether or not the brightness dispersion V2 of the non-finder image is smaller than the brightness dispersion V1 of the finder image and the difference therebetween exceeds the predetermined threshold TH1 (step S203).

When the brightness dispersion V2 is smaller than the brightness dispersion V1 and the difference therebetween exceeds the predetermined threshold TH1 (step S203:YES), the sameness determining unit 214 determines that an abnormality like the unexpected appearance of an obstacle occurs in the non-finder image, and gives a notification to that effect to the warning processing unit 215. Based on the notification from the sameness determining unit 214, the warning processing unit 215 executes a warning process in order to cause the user of the digital camera 1 to recognize that an abnormality is occurring in the non-finder image.

Figure 10A:
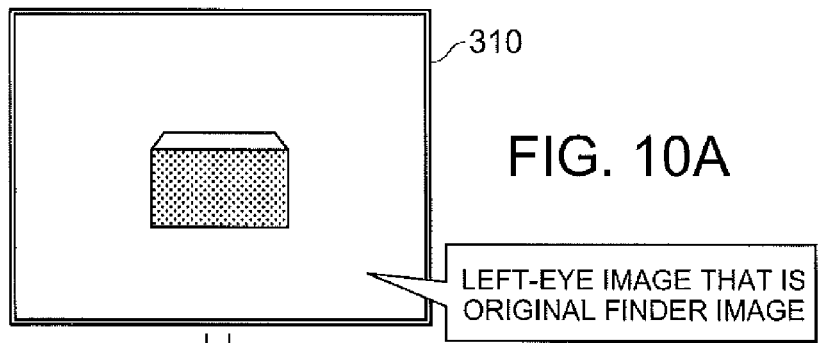
FIG. 10A is a diagram for explaining the "abnormality warning process" shown in FIG. 9, and showing an example way of displaying when an abnormality is detected through a non-finder image.
Figure 10B:
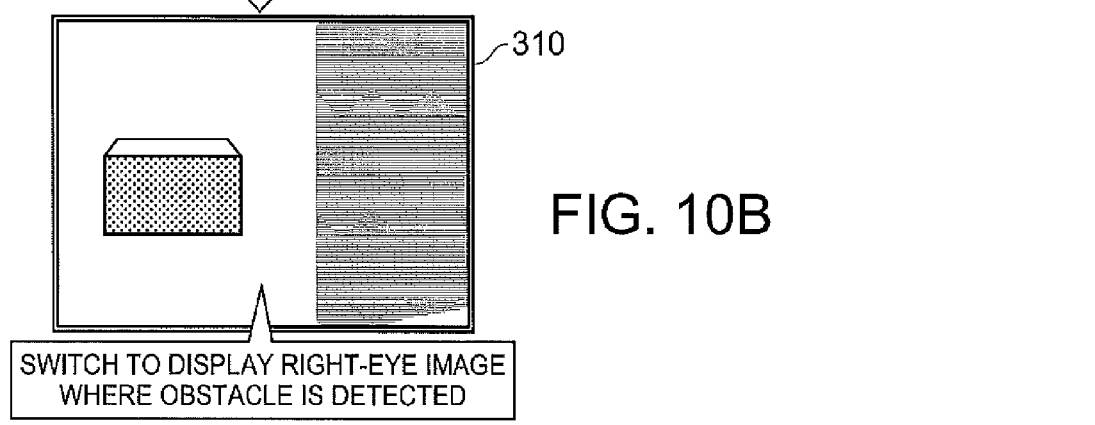
FIG. 10B is a diagram for explaining the "abnormality warning process" shown in FIG. 9, and showing an example way of displaying when an abnormality is detected through a non-finder image.

The finder image is switched by controlling the image outputting unit 240 (step S204). That is, the source of the finder image is changed over from the first image pickup unit 110 to the second image pickup unit 120, thereby switching the finder image from the live-view image (the left-eye image) by the first image pickup unit 110 which was the original finder image to the live-view image (the right-eye image) by the second image pickup unit 120, and the finder image is displayed on the display unit 310, as shown in FIGS. 10A and 10B.

When the finder image is switched, the warning processing unit 215 inverts the value of the finder flag (step S205). In this case, the flag value is changed from "0" to "1".

When a warning by switching of the finder image in this fashion is made, the processes after the step S201 are repeated again. Because the flag value is inverted in the step S205, the finder image in the step S201 becomes the live-view image (the right-eye image) by the second image pickup unit 120, and the non-finder image in the step S202 becomes the live-view image (the left-eye image) by the first image pickup unit 110.

Because of the switching of the finder image, the user of the digital camera 1 becomes able to visually recognize the unexpected appearance of an obstacle, etc., so that the user can take an action of eliminating the obstacle. When the cause of the abnormality is eliminated, respective brightness dispersions of the right and left images become substantially same (step S203: NO, and step S206: NO), so that this process is terminated and returns to the flow of the "second stereoscopic image pickup process" (see FIG. 8).

Conversely, after the start of the "abnormality warning process", when the brightness dispersion V1 of the finder image (in this case, the picked-up image by the first image pickup unit 110) is smaller than the brightness dispersion V2 of the non-finder image (in this case, the picked-up image by the second image pickup unit 120), and the difference therebetween exceeds the predetermined threshold TH1 (step S203: NO, step S206: YES), this means that an abnormality like the unexpected appearance of an obstacle is occurring in the finder image.

Figure 10C:
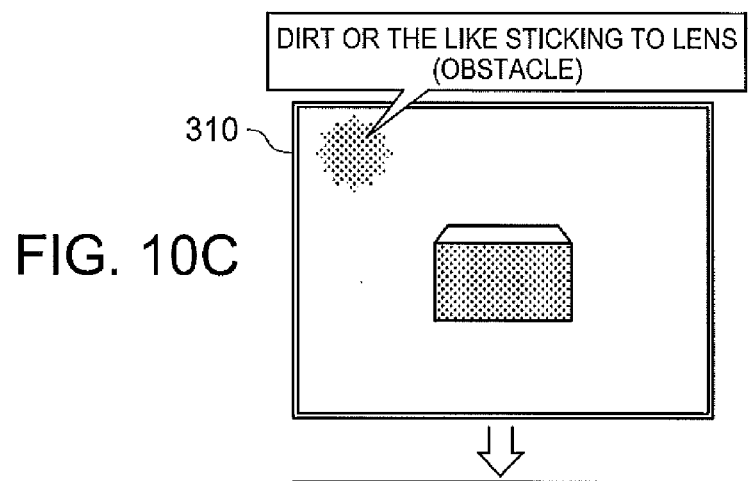
FIG. 10C is a diagram for explaining the "abnormality warning process" shown in FIG. 9, and showing an example way of displaying when an abnormality is detected through a finder image.
Figure 10D:
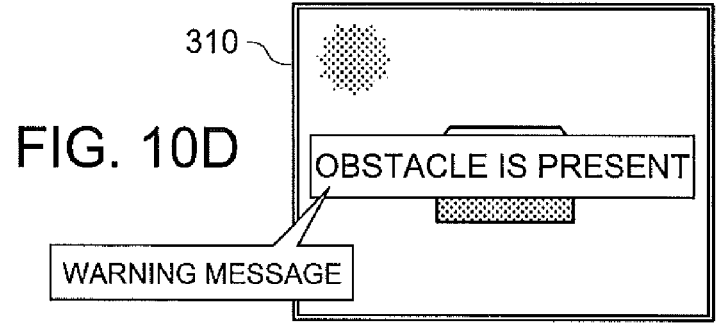
FIG. 10D is a diagram for explaining the "abnormality warning process" shown in FIG. 9, and showing an example way of displaying when an abnormality is detected through a finder image.

Because the finder image is displayed on the display unit 310, the user of the digital camera 1 highly possibly recognizes such an abnormality, but like a case as shown in FIG. 10C, the unexpected appearance of a tiny obstacle like a dirt sticking on the lens is unrecognizable in some cases. Therefore, when it is determined that there is an abnormality in the finder image, the warning processing unit 215 displays a warning message so as to be superimposed on the finder image displayed on the display unit 310 as shown in FIG. 10D (step S207).

In this case, also, by repeating of the processes after the step S201, the warning display is made until the unexpected appearance of an obstacle, etc., is eliminated, and when the cause of the abnormality is eliminated, respective brightness distributions of the right and left images become substantially same (step S203: NO, step S206: NO), this process is terminated and returns to the flow of the "second stereoscopic image pickup process" (see FIG. 8). As explained above, when the difference between the brightness dispersion V1 and the brightness dispersion V2 is equal to or less than the threshold TH1, it is determined that respective brightness distributions of the right and left images are substantially same, and there is no obstacle appearing in both picked-up images. Conversely, when the difference between the brightness dispersion V1 and the brightness dispersion V2 is equal to or larger than the threshold TH1, it is determined that respective brightness distributions differ from each other, and there is an obstacle appearing in at least either one of the picked-up images.

When the flow returns to the "second stereoscopic image pickup process", the warning processing unit 215 resets the finder flag, and controls the image outputting unit 240, thereby causing the display unit 310 to display a finder image corresponding to the flag value (step S24). That is, in the "abnormality warning process" (see FIG. 9), when the finder image is switched, the live-view image (the left-eye image) by the first image pickup unit 110 is displayed on the display unit 310 again as the finder image.

In this fashion, when the screen becomes a normal finder screen, in response to the operation of the shutter button of the operating unit 330 (step S25: YES), the image pickup control unit 212 controls the image pickup operation unit 100, so that a stereoscopic image pickup operation is carried out (step S26).

If no termination event, such as cancelling of the "stereoscopic image pickup mode" or power off of the digital camera 1 occurs (step S27: NO), the processes after the step S22 are repeated, and the stereoscopic image pickup operation is continued. Upon occurring of the termination event, this process is terminated (step S27: YES).

Through the above-explained processes, when an abnormality like the unexpected appearance of an obstacle in the non-finder image is detected, the finder image is switched, and when an abnormality in the finder image is detected, a warning message is displayed. This allows the user of the digital camera 1 to further efficiently recognize the occurrence of the abnormality.

In the present example, brightness dispersions are used for detecting features between the right and left images. The present invention is, however, not limited to this case, and for example, a spatial frequency of each image may be calculated through a Fourier conversion process, and an image having lots of low-frequency components may be determined as a warning target.

Moreover, in the present example, when an abnormality like the unexpected appearance of an obstacle in the non-finder image is detected, the finder image is switched. However, when the abnormality like the unexpected appearance of an obstacle in the non-finder image is detected, as shown in FIG. 7C, the right and left images may be displayed on the display unit 310 in a parallel manner so that both images are visually recognized simultaneously. Moreover, when an abnormality in the finder image is detected, the right and left images may be displayed on the display unit 310 in a parallel manner so that both images are visually recognized simultaneously.

Third Example

In the above-explained individual examples, an image by either one image pickup unit is used as a predetermined finder image, and when an abnormality like the unexpected appearance of an obstacle occurs, at least a non-finder image is visibly displayed so as to cause the user of the digital camera 1 to recognize such an abnormality. According to the present invention, however, switching of the finder image may be manually operated by the user of the digital camera 1.

For example, like the first example, when it is difficult to determine in which picked-up image an abnormality is occurring, and when an abnormality is detected, for example, a warning message is displayed on the finder screen. If such an abnormality is occurring in the finder image, the user of the digital camera 1 can visually recognize such an abnormality, so that it is possible for the user to take an action of eliminating the cause of the abnormality. Conversely, when it is difficult to visually recognize the abnormality in the finder image, such an abnormality is highly possibly occurring in the non-finder image, so that the finder image is switched in response to an arbitrary operation given by the user.

According to such an operation, even in the case of the detecting method which cannot specify the occurrence source of the abnormality, it is possible for the user of the digital camera 1 to efficiently recognize such an abnormality, and thus the cause of the abnormality can be effectively eliminated.

It is fine if a setting is not made beforehand regarding which image pickup unit supplies a finder image, and even when the user of the digital camera 1 is enabled to arbitrarily select a finder image, it is possible for the user to recognize the unexpected appearance of an obstacle. For example, in the process exemplified in the second example, when the user of the digital camera 1 is enabled to arbitrarily select a finder image, the warning process exemplified in the second example can be realized by setting the finder flag in accordance with a selection.

In this case, for example, the finder flag may not be reset in the step S24 of the "second stereoscopic image pickup process" (see FIG. 8) in the second example, and a finder display may be made in accordance with an arbitrary operation given by the user of the digital camera 1.

As explained above, by applying the present invention as explained in the foregoing examples, when an abnormality occurs in an image by the image pickup unit which is not used as the finder image in a stereoscopic camera, it is possible for the user of such a camera to recognize the abnormality.

In this case, it is possible to determine the presence/absence of occurrence of an abnormality based on respective histograms of right and left images, so that such a process can be executed through a histogram function that typical digital cameras have.

Moreover, in this case, because both right and left images are displayed simultaneously, it is possible for the user of the digital camera 1 to recognize an abnormality that is occurring in the non-finder image.

Alternatively, it is possible to determine whether or not an abnormality is present based on respective brightness dispersions of right and left images, and in this case, it is possible to specify in which image such an abnormality is occurring.

In this case, when the abnormality is occurring in the non-finder image, warning is made by switching of the finder image, so that, for example, the image including the abnormality can be displayed in a full screen manner, which makes it possible for the digital camera 1 to effectively cause the user thereof to recognize such an abnormality.

Moreover, when the abnormality is occurring in the finder image, a warning message is displayed on the finder screen, so that the user of the digital camera 1 can recognize an abnormality which is likely to be unrecognized during image pickup.

Furthermore, when the finder image is selected arbitrarily by an operation given by the user of the digital camera 1, it is possible for the digital camera 1 to cause the user thereof to appropriately recognize such an abnormality.

The above-explained examples are merely examples, and the present invention is not limited to those examples. That is, the present invention can be changed and modified in various forms, and such changed and modified embodiments are included in the scope and the spirit of the present invention.

For example, how to detect a feature explained in each example is just an example, and how to detect a feature is optional as long as it is possible to detect in which picked-up image an abnormality is occurring.

In the foregoing examples, the explanation was given of an example case in which the abnormality is the unexpected appearance of an obstacle, such as a finger contacting the lens face or a dirt sticking to the lens. However, the digital camera 1 of the present invention can warn an event that disturbs generation of a stereoscopic image because of the difference between right and left images. For example, such an abnormal event is that right and left images largely differ from each other because the distance to an object is too close. In this case, it is possible to make a distinction between such an event and the unexpected appearance of an obstacle based on the focal distance, etc., at this time.

In the above-explained examples, an image where an obstacle or the like unexpectedly appears is presented to the user of the digital camera 1 as a finder image, but the position of such an obstacle in the finder screen is not presented to the user. According to the present invention, however, such a position of the obstacle in the finder screen may be presented to the user. An explanation will now be given of an example technique of presenting the position of an obstacle in the finder screen to the user of the digital camera 1. According to this example technique, the finder screen is divided into plural regions, and a region where the obstacle is present is clearly specified, thereby presenting an approximate position of the obstacle in the finder screen to the user.

It is possible to adjust how to divide the display unit 310 accordingly. For example, the display unit 310 may be divided so that N number of regions (where N is a natural number equal to or greater than two) are arranged side by side in a shorter-side direction (the vertical direction in FIGS. 11A to 11C), and M number of regions (where M is a natural number equal to or greater than two) are arranged side by side in the longer-side direction (the horizontal direction in FIGS. 11A to 11C). Alternatively, N times M number of regions may be arranged in a matrix manner in the shorter-side direction and the longer-side direction.

Figure 11A:
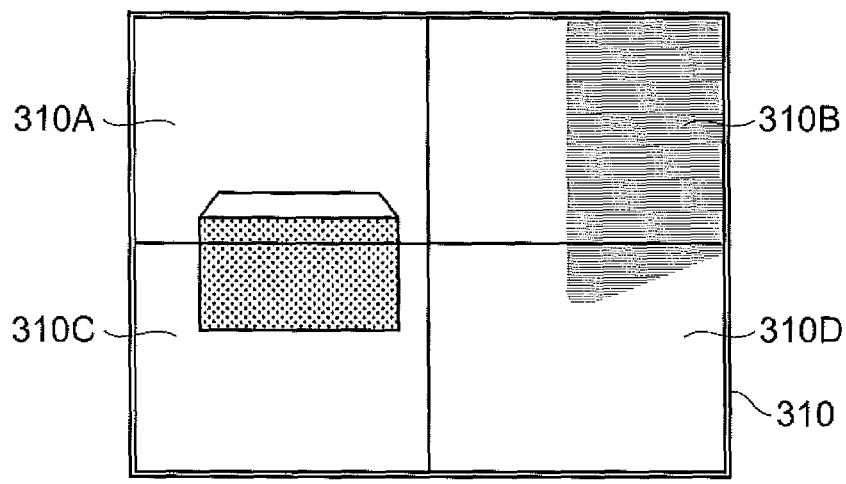
FIG. 11A is a diagram showing how a finder screen is divided.

FIG. 11A shows the way the display unit 310 is divided into two pieces in the vertical direction and two pieces in the horizontal direction. In the case of FIG. 11A, the upper left region is a region 310A, the upper right region is a region 310B, the lower left region is a region 310C, and the lower right region is a region 310D.

First, the control unit 210 specifies a region where an obstacle is displayed (hereinafter, referred to as an "obstacle belonging region") among the four regions. How to specify the obstacle belonging region is optional. For example, the obstacle belonging region can be specified based on the feature of respective brightness values of pixels configuring the obstacle belonging region.

For example, when a region includes an obstacle, the brightness dispersion of that region (dispersion of brightness values of all pixels configuring that region) decreases in some cases. In this case, the brightness dispersion of the obstacle belonging region becomes highly possibly smaller than respective brightness dispersions of other regions where no obstacle is present. Accordingly, for example, it is possible to estimate that the region having the smallest brightness dispersion is the obstacle belonging region. The brightness dispersion in the obstacle belonging region in the finder image is estimated to be smaller than the brightness dispersion of the corresponding region in the non-finder image. Therefore, it is possible to estimate that, in a finder image, a region having a relatively smallest brightness dispersion compared with the corresponding region in the non-finder image, from among the regions in the finder image, is the obstacle belonging region. For example, it is possible to estimate that a region having a smallest value is the obstacle belonging region, where from the value of brightness dispersion of a region in the finder image, the value of brightness dispersion of the corresponding region in the non-finder image is subtracted or where the value of brightness dispersion of a region in the finder image is divided by the value of brightness dispersion of the corresponding region in the non-finder image. The possible reason why the brightness dispersion decreases due to the appearance of an obstacle is that an image is highly possibly blurred if an obstacle like a finger is included therein, and the color and the shine of the obstacle are highly possibly uniform.

When a region includes an obstacle, the total of brightness values of all pixels configuring that region decreases in some cases. In this case, the total of the brightness values of the obstacle belonging region highly possibly becomes smaller than the total of the brightness value of another region where no obstacle is present. Hence, for example, it is possible to estimate that a region having the smallest total of brightness values is the obstacle belonging region. The total of the brightness values in the obstacle belonging region in the finder image is estimated to be smaller than the total of the brightness values of the corresponding region in the non-finder image. Therefore, it is possible to estimate that, in a finder image, a region having a relatively smallest total of the brightness values compared with the corresponding region in the non-finder image, from among the regions in the finder image, is the obstacle belonging region. For example, it is possible to estimate that a region having a smallest value is the obstacle belonging region, where from the total of the brightness values of a region in the finder image, the total of the brightness values of the corresponding region in the non-finder image is subtracted or where the total of the brightness values of a region in the finder image is divided by the total of the brightness values of the corresponding region in the non-finder image. The possible reason why the total of the brightness values decreases due to the presence of the obstacle is that light is blocked when there is an obstacle like a finger.

Through the above-explained technique, the control unit 210 specifies the obstacle belonging region. FIG. 11A shows an example case in which the obstacle belongs to the region 310B. In this case, it is clearly specified that the obstacle is displayed in the region 310B through various schemes.

Figure 11B:
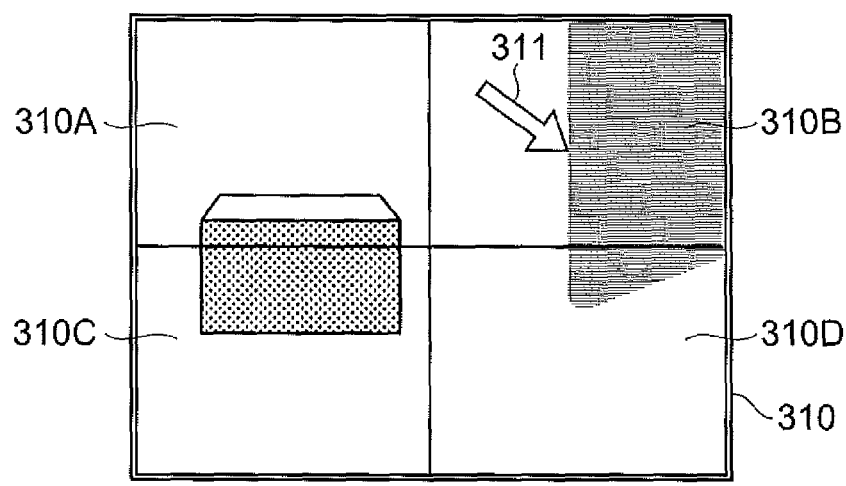
FIG. 11B is a diagram showing how the position of an obstacle is clearly indicated by an arrow image.

For example, as shown in FIG. 11B, the control unit 210 displays an arrow image 311 pointing out the obstacle belonging region on the display unit 310. According to this configuration, it is possible for the user of the digital camera 1 to instantaneously figure out that the region 310B indicated by the arrow image 311 is the obstacle belonging region.

Figure 11C:
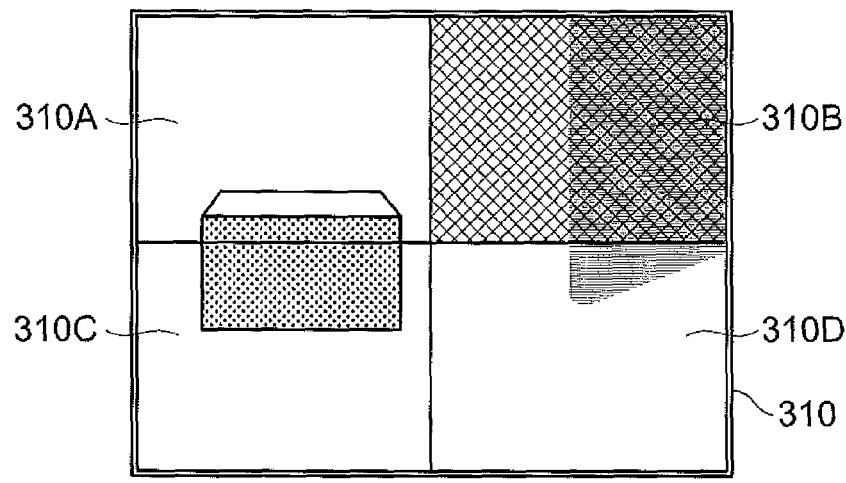
FIG. 11C is a diagram showing how the position of an obstacle is clearly indicated by a gray display.

Alternatively, as shown in FIG. 11C, the control unit 210 causes the object belonging region to be subjected to a gray display (in FIG. 11C, however, such a gray display is indicated by hatching). According to this configuration, it is possible for the user of the digital camera 1 to instantaneously figure out that the region 310B subjected to gray display is the obstacle belonging region.

The schemes of indicating the obstacle belonging region are not limited to the above-explained ones. For example, the obstacle belonging region may be surrounded by a frame image, or letter strings indicating the obstacle belonging region may be displayed.

As explained above, according to the present invention, it is possible to clearly specify an approximate position of an obstacle in a finder image in order to cause the user of the digital camera 1 to eliminate such an obstacle quickly.

In the examples shown in FIGS. 11A to 11C, lines for the boundaries of plural regions are shown, but it is fine if such lines for the boundaries are not displayed in practice.

It is needless to say that the present invention can be embodied by an image pickup device that has the same function and configuration as those of the image pickup device of the above-explained embodiment. Moreover, as long as a picked-up image corresponding to a parallax can be obtained, by installing a program in any existing image pickup devices (e.g., digital cameras), such image pickup devices can function as the image pickup device of the present invention. In this case, by causing the computer (a control unit like a CPU) of the image pickup device having the similar configuration to that of the digital camera 1 exemplified in the above-explained embodiment to run a program for realizing the same functions as those of the control unit 210 explained above, such an image pickup device can function as the image pickup device of the present invention.

In the foregoing embodiment, as an example of the image pickup device, a digital still camera was explained. However, the form of the image pickup device is optional as long as such an image pickup device has the similar configuration to that of the digital camera 1 exemplified in the foregoing embodiment. For example, a digital video camera can realize the image pickup device of the present invention.

In any cases, by installing a program, any existing devices can function as the image pickup device of the present invention. How to apply such a program is optional, and for example, such a program can be applied in the form of being stored in a memory medium like a CD-ROM or a memory card, and can be applied through a communication medium like the Internet.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. An image pickup device comprising:
   an image pickup unit that obtains two picked-up images of a same object with respective optical axis positions being different from each other;
   a finder image selecting unit that selects either one of the two picked-up images as a finder image;
   a finder display unit that displays the finder image selected by the finder image selecting unit on a finder screen;
   a feature detecting unit that detects features of the two picked-up images;
   an abnormality determining unit that determines whether or not an abnormality is present in one of the two picked-up images based on the features detected by the feature detecting unit; and
   a warning unit that issues a warning regarding an abnormality when the abnormality determining unit determines that an abnormality is present,
   wherein the feature detecting unit calculates a brightness dispersion representing a dispersion of brightness values of pixels configuring the picked-up image for each of the two picked-up images,
   wherein the abnormality determining unit determines whether or not an abnormality is present based on a comparison of respective brightness dispersions between the two picked-up images calculated by the feature detecting unit, and
   wherein when a difference between the brightness dispersion of the picked-up image selected by the finder image selecting unit and the brightness dispersion of the picked-up image not selected by the finder image selecting unit exceeds a predetermined threshold, the warning unit displays information indicating a region in the picked-up image with a smaller brightness dispersion where an abnormality is present on the finder screen.

2. The image pickup device according to claim 1, wherein the warning unit specifies a divisional region having a smallest brightness dispersion of pixels in that divisional region among a plurality of divisional regions configuring the picked-up image with the smaller brightness dispersion as a region where the abnormality is present.

3. The image pickup device according to claim 1, wherein the warning unit specifies a divisional region having a smallest total of brightness values of pixels in that divisional region among a plurality of divisional regions configuring the picked-up image with the smaller brightness dispersion as a region where the abnormality is present.

4. The image pickup device according to claim 1, wherein the warning unit specifies, in one image with the smaller brightness dispersion of pixels of the two picked-up images, a divisional region having a relatively smallest brightness dispersion of pixels contained therein, compared with a corresponding divisional region in the other of the two picked-up images, from among a plurality of divisional regions configuring that picked-up image, as a region where the abnormality is present.

5. The image pickup device according to claim 1, wherein the warning unit specifies, in one image with the smaller dispersion of brightness values of pixels of the two picked-up images, a divisional region having a relatively smallest total of brightness values of pixels contained therein, compared with a corresponding divisional region in the other of the two picked-up images, from among a plurality of divisional regions configuring that picked-up image, as a region where the abnormality is present.

6. The image pickup device according to claim 1, wherein the warning unit displays a region where the abnormality is present on the finder screen in a gray display manner.

7. The image pickup device according to claim 1, wherein the warning unit displays an arrow image indicating a region where the abnormality is present on the finder screen.

8. The image pickup device according to claim 1, wherein the finder image selecting unit selects the finder image in accordance with an operation given by a user of the image pickup device.

9. An image pickup device comprising:
   an image pickup unit that obtains two picked-up images of a same object with respective optical axis positions being different from each other;
   a finder image selecting unit that selects either one of the two picked-up images as a finder image;
   a finder display unit that displays the finder image selected by the finder image selecting unit on a finder screen;
   a feature detecting unit that detects features of the two picked-up images;

an abnormality determining unit that determines whether or not an abnormality is present in one of the two picked-up images based on the features detected by the feature detecting unit; and a warning unit that issues a warning regarding an abnormality when the abnormality determining unit determines that an abnormality is present, wherein the feature detecting unit calculates a brightness dispersion representing a dispersion of brightness values of pixels configuring the picked-up image for each of the two picked-up images, wherein the abnormality determining unit determines whether or not an abnormality is present based on a comparison of respective brightness dispersions between the two picked-up images calculated by the feature detecting unit, and wherein when (i) the brightness dispersion of the picked-up image not selected by the finder image selecting unit is smaller than the brightness dispersion of the picked-up image selected by the finder image selecting unit and (ii) a difference between those brightness dispersions exceeds a predetermined threshold, the warning unit switches the finder image displayed by the finder display unit to the picked-up image not selected by the finder image selecting unit.

10. An image pickup device comprising:

an image pickup unit that obtains two picked-up images of a same object with respective optical axis positions being different from each other;

a finder image selecting unit that selects either one of the two picked-up images as a finder image;

a finder display unit that displays the finder image selected by the finder image selecting unit on a finder screen;

a feature detecting unit that detects features of the two picked-up images;

an abnormality determining unit that determines whether or not an abnormality is present in one of the two picked-up images based on the features detected by the feature detecting unit; and a warning unit that issues a warning regarding an abnormality when the abnormality determining unit determines that an abnormality is present, wherein the feature detecting unit calculates a brightness dispersion representing a dispersion of brightness values of pixels configuring the picked-up image for each of the two picked-up images, wherein the abnormality determining unit determines whether or not an abnormality is present based on a comparison of respective brightness dispersions between the two picked-up images calculated by the feature detecting unit, and wherein when (i) the brightness dispersion of the picked-up image selected by the finder image selecting unit is smaller than the brightness dispersion of the picked-up image not selected by the finder image selecting unit and (ii) a difference between those brightness dispersions exceeds a predetermined threshold, the warning unit displays a warning message on the finder screen displayed by the finder display unit.

11. A warning method executed by an image pickup device including an image pickup unit that obtains two picked-up images of a same object with respective optical axis positions being different from each other in order to cause a user of the image pickup device to recognize an abnormality in a picked-up image, the method comprising:

selecting either one of the two picked-up images as a finder image;

displaying the finder image on a finder screen of the image pickup device, detecting features of the two picked-up images;

determining whether or not an abnormality is present in one of the two picked-up images based on the detected features; and issuing a warning regarding an abnormality when it is determined that an abnormality is present, wherein the detecting comprises calculating a brightness dispersion representing a dispersion of brightness values of pixels configuring the picked-up image for each of the two picked-up images, wherein the determining comprises determining whether or not an abnormality is present based on a comparison of respective brightness dispersions between the two picked-up images calculated by the detecting, and wherein when (i) the brightness dispersion of the picked-up image not selected as the finder image is smaller than the brightness dispersion of the picked-up image selected as the finder image and (ii) a difference between those brightness dispersions exceeds a predetermined threshold, the issuing comprises switching the finder image to the picked-up image not selected as the finder image.

12. A non-transitory computer-readable recording medium tangibly storing a program that controls a computer of an image pickup device including an image pickup unit that obtains two picked-up images of a same object with respective optical axis positions being different from each other to perform functions comprising:

selecting either one of the two picked-up images as a finder image;

displaying the finder image on a finder screen of the image pickup device, detecting features of the two picked-up images;

determining whether or not an abnormality is present in one of the two picked-up images based on the detected features; and issuing a warning regarding an abnormality when it is determined that an abnormality is present, wherein the detecting comprises calculating a brightness dispersion representing a dispersion of brightness values of pixels configuring the picked-up image for each of the two picked-up images, wherein the determining comprises determining whether or not an abnormality is present based on a comparison of respective brightness dispersions between the two picked-up images calculated by the detecting, and wherein when (i) the brightness dispersion of the picked-up image not selected as the finder image is smaller than the brightness dispersion of the picked-up image selected as the finder image and (ii) a difference between those brightness dispersions exceeds a predetermined threshold, the issuing comprises switching the finder image to the picked-up image not selected as the finder image.

* * * * *